3,660,485
FLUORENE-9-CARBOXYLIC ACID HYDRAZIDES
John W. Cusic, Skokie, and Chung Hwai Yen, Chicago, Ill., assignors to G. D. Searle & Co., Chicago, Ill.
No Drawing. Filed Oct. 5, 1970, Ser. No. 78,278
Int. Cl. C07c 103/19
U.S. Cl. 260—558 H                                    4 Claims

ABSTRACT OF THE DISCLOSURE

Hydrazides of 9-aminoalkyl fluorene-9-carboxylic acid are described herein. Generally, these compounds are obtained by the reaction of the appropriate ester with hydrazine. The compounds are useful against bacteria, helminths, fungi, and algae. In addition, they are antiarrhythmic agents.

---

The present invention relates to a group of hydrazides of 9-aminoalkylfluorene-9-carboxylic acids. More particularly, it relates to a group of compounds having the following general formula

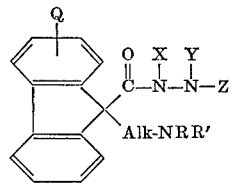

wherein Alk is lower alkylene; —NRR' is selected from the group consisting of di(lower alkyl)amine, 1-pyrrolidinyl, and piperidino; X and Y are each selected from the group consisting of hydrogen and methyl; Z is selected from the group consisting of hydrogen, methyl, and lower alkanoyl; and Q is selected from the group consisting of hydrogen and halogen.

The lower alkylene radicals referred to above contain up to 6 carbon atoms and can be exemplified by ethylene, propylene, and trimethylene. The lower alkyl radicals referred to above contain up to 6 carbon atoms and can be exemplified by radicals such as methyl, ethyl, propyl, isopropyl, and butyl. The lower alkanoyl radicals referred to above contain up to 6 carbon atoms and can be exemplified by acetyl, propionyl, and butyryl. The halogen atoms referred to above can be fluorine, chlorine, bromine, and iodine.

The organic bases of this invention form pharmaceutically acceptable salts with a variety of inorganic and strong organic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The present compounds are useful because of their anti-biotic activity against a variety of organisms. Thus, they inhibit the growth of bacteria such as *Bacillus subtilis*, *Salmonella paratyphi* A, and Erwinia species; helminths such as *Turbatrix aceti*, fungi such as *Verticillium albo-atrum*, and algae such as *Chlorella vulgaris*. The present compounds can thus be combined with various known excipients and adjuvants in the form of dusts, solutions, suspensions, ointments, and sprays to provide compositions useful for disinfecting purposes.

The anthelmintic utility of the instant compounds is evident from the results of a standardized test for their capacity to immobilize *Turbatrix aceti*, a representative nematode. In this test, a washed suspension of *Turbatrix aceti* containing approximately 2000 nematodes per ml. is prepared in distilled water, and 1 ml. of the suspension is mixed with 10 mg. of test compound. The mixture is incubated at room temperature for 48 hours and then examined grossly for the presence of motile worms. If any are observed, the compound is considered inactive. If no motile worms are observed, 0.1 ml. of the incubated mixture is serially diluted and mixed with a freshly prepared suspension of the nematode. The resultant mixtures are incubated as before at room temperature for 48 hours and then examined grossly for the presence of motile worms. Controls are provided by concurrent incubations identical with the foregoing except for the absence of test compound. 9-(2-dimethylaminoethyl)fluorene-9-carboxylic acid hydrazide, 9-(3-dimethylaminopropyl)fluorene-9-carboxylic acid hydrazide, and 1 - [9 - (2 - diethylaminoethyl)fluorene-9-carbonyl]-2-methylhydrazine were each found to be active when tested by the above procedure.

The present compounds are also useful as anti-arrhythmic agents. This utility is demonstrated by their ability to restore a normal sinus rhythm to dogs in which ventricular arrhythmia has been induced by ouabain. More specifically, anesthetized male dogs are given 40 mcg./kg. ouabain intravenously followed by 20 mcg./kg. 30 minutes later in turn followed by 10 mcg./kg. every 15 minutes until ventricular arrhythmia occurs and persists for 15 minutes. Then, 5 m.p.k. of test compound is administered intravenously to the animal and this is repeated every 10 minutes until normal sinus rhythm returns or until a total dose of 20 mg./kg. is attained. A compound which restores a normal sinus thythm within the indicated dose range is considered active. Thus, when 9-(2-diethylaminoethyl)fluorene-9-carboxylic acid hydrazide and 1-[9-(2-diethylaminoethyl)fluorene-9-carbonyl]-1,2,2-trimethylhydrazine were tested according to this procedure, they were found to restore a normal sinus rhythm.

The compounds of the present invention are usually prepared from an ester of the formula

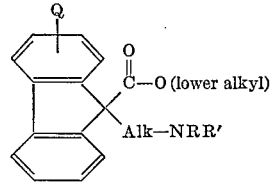

wherein Alk, —NRR' and Q are defined as above and lower alkyl is preferably methyl. This ester is heated with hydrazine or an appropriate substitute hydrazine to give the desired hydrazide. Where the nitrogens are the hydrazide are completely substituted, it is also possible to prepare the present compounds by first making the fluorene-9-carboxylic acid hydrazide and then reacting this with an alkali metal in liquid ammonia and with a dialkylaminoalkyl halide or similar compound to give the desired product.

The following examples are presented to further illustrate the present invention; they should not be construed as limiting it in spirit or in scope. In these examples, quantities are indicated in parts by weight and temperatures in degrees centgrade (° C.).

EXAMPLE 1

A mixture of 88 parts of methyl fluorene-9-carboxylate, 11 parts of lithium amide and 540 parts of toluene is stirred and refluxed for 2.5 hours. Then 60 parts of 2-diethylaminoethyl chloride is added and the resulting mixture is refluxed and stirred for 3 hours. It is then cooled to room temperature and stirred with dilute sodium hydroxide solution. The toluene layer is then separated and extracted with dilute hydrochloric acid. The acid extract is washed with ether, made alkaline with sodium hydroxide solution, and finally extracted with ether. The ether extract is dried over sodium sulfate and the solvent is evaporated under reduced pressure. The residue is distilled to give methyl 9-(2-diethylaminoethyl)fluorene-9-carboxylate boiling at about 185–187° C. at 1 mm. pressure.

A mixture of 10 parts of the ester obtained in the preceding paragraph and 10 parts of hydrazine hydrate in 20 parts of ethanol is heated on a steam bath for 3 hours. The solvent is then slowly evaporated to leave a residue which solidifies. The solid is recrystallized from a mixture of benzene and heptane to give 9-(2-diethylaminoethyl)fluorene-9-carboxylic acid hydrazide melting at about 127–129° C. This compound has the following formula

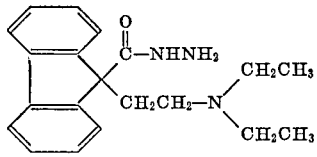

EXAMPLE 2

A mixture of 45 parts of methyl fluorene-9-carboxylate, 29 parts of potassium hydroxide, 31.7 parts of 2-dimethylaminoethyl chloride hydrochloride and 800 parts of 2-butanone is heated and stirred for 16 hours. The solvent is then evaporated under reduced pressure, the residue is treated with water and dilute sodium hydroxide and then extracted with ether. The ether extract is washed with water and then extracted with dilute hydrochloric acid. The acid extract is made alkaline with dilute sodium hydroxide and then extracted with ether. The ether extract is dried and the solvent is evaporated under reduced pressure to leave a residual oil. This is distilled under reduced pressure to give methyl 9-(2-dimethylaminoethyl)fluorene-9-carboxylate boiling at about 140–165° C. at 1–2.5 mm. pressure.

A mixture of 32 parts of the ester obtained in the preceding paragraph, 40 parts of 85% hydrazine hydrate and 120 parts of ethanol is heated at reflux for 8 hours. The solvent is evaporated under reduced pressure and the resulting residue is dissolved in about 20 parts of ether. Pentane is added until the solution becomes turbid. The mixture is allowed to stand for 16 hours and an oil eventually forms. This solidifies with stirring and the mixture is further diluted with pentane. The solid is then separated by filtration and recrystallized from ether to give 9-(2-dimethylaminoethyl)fluorene-9-carboxylic acid hydrazide melting at about 127.5–129.5° C.

EXAMPLE 3

67 parts of methyl fluorene-9-carboxylate, 47 parts of 3-dimethylaminopropyl chloride hydrochloride, 44 parts of potassium hydroxide, and 800 parts of 2-butanone are heated to reflux with stirring and then refluxed for 16 hours. The mixture is cooled and the solvent is evaporated under reduced pressure. The residue is mixed with water and dilute sodium hydroxide and the alkaline mixture is extracted with ether. The ether extract is washed with water and then extracted with dilute hydrochloric acid. The acid extract is made alkaline with sodium hydroxide and then extracted with ether. The ether extract is dried over sodium sulfate, the solvent is evaporated under reduced pressure, and the residue is distilled to give methyl 9-(3-dimethylaminopropyl)fluorene-9-carboxylate boiling at about 157–161° C. at 0.17–0.22 mm. pressure.

A mixture of 52 parts of methyl 9-(3-dimethylaminopropyl)fluorene-9-carboxylate, 65 parts of 85% hydrazine hydrate and 200 parts of ethanol is refluxed for 6 hours. The solvent is then evaporated under reduced pressure and 90 parts of benzene is added to the residue. The solvent is again evaporated and the residue is triturated with pentane whereupon most of the solid dissolves. The pentane solution is then cooled in a refrigerator and the solid which precipitates is separated by filtration, washed with pentane and then recrystallized from hexane. The product obtained in this way is 9-(3-dimethylaminopropyl)fluorene-9-carboxylic acid hydrazide melting at about 102–104° C.

EXAMPLE 4

To a suspension of 2.1 parts of lithium amide powder in 150 parts of dry toluene there is added portionwise 18 parts of methyl fluorene-9-carboxylate. The resulting mixture is stirred and refluxed for 2.5 hours and then a solution of 13.8 parts of 2-diisopropylaminoethyl chloride in 27 parts of dry toluene is added over a period of 20 minutes at reflux temperature. The mixture is then refluxed for 3 hours before it is cooled to room temperature and stirred with water and dilute sodium hydroxide. The toluene layer is then separated and extracted with dilute hydrochloric acid and the acid extract is washed with ether, made alkaline with dilute sodium hydroxide, and extracted with ether. This ether extract is dried over sodium sulfate and the solvent is evaporated under reduced pressure. The residue is distilled to give methyl 9-(2-diisopropylaminoethyl)fluorene-9-carboxylate boiling at about 170–172° C. at 0.15 mm. pressure.

A solution of 25 parts of methyl 9-(2-diisopropylaminoethyl)fluorene-9-carboxylate in 60 parts of ethanol is added portionwise over a period of 45 minutes to a refluxing solution of 30 parts of 85% hydrazine hydrate in 40 parts of ethanol. The mixture is then refluxed for 8 hours. The solvent is evaporated under reduced pressure and 100 parts of benzene is added to the residue. Evaporation of the solvent, addition of benzene and evaporation is repeated. The residue is then stirred with pentane. A white precipitate forms. This is separated by filtration and recrystallized from ether to give 9-(2-diisopropylaminoethyl)fluorene-9-carboxylic acid hydrazide melting at about 127.5–130° C.

EXAMPLE 5

The procedure of the first paragraph of Example 4 is repeated using 2-piperidinoethyl chloride in place of the 2-diisopropylaminoethyl chloride. The product is distilled once and then redistilled to give methyl 9-(2-piperidinoethyl)fluorene-9-carboxylate boiling at about 164–194° C. at 0.75 mm. pressure. A mixture of 32 parts of this ester, 40 parts of 85% hydrazine hydrate and 160 parts of ethanol is refluxed for 5 hours. The solvent is evaporated under reduced pressure and 90 parts of benzene is added to the residue. The solvent is again evaporated under reduced pressure and the residue is mixed with pentane and cooled. A gummy residue forms. This is recrystallized first from hexane, then from a mixture of benzene and hexane, and finally twice from a mixture of ether and pentane to give 9-(2-piperidinoethyl)fluorene-9-carboxylic acid hydrazide melting at about 62–69° C.

EXAMPLE 6

A mixture of 5 parts of methyl 9-(2-diethylaminoethyl)fluorene-9-carboxylic, 20 parts of methylhydrazine, 0.1 part of sodium methoxide and 120 parts of 2-propanol is refluxed for 96 hours. The solvent is then evaporated under reduced pressure and the residue is dissolved in ether. The ether solution is washed with dilute sodium hydroxide and extracted with dilute hydrochloric acid. The acid extract is made alkaline and extracted with ether. The ether solution is dried and the solvent is evaporated to leave a light yellow oil. This is recrystallized from pentane to give 1 - [9 - (2-diethylaminoethyl)fluorene-9-carbonyl]-2-methylhydrazine melting at about 85–87° C.

EXAMPLE 7

To a solution of 10 parts of 9-(2-diethylaminoethyl)fluorene-9-carboxylic acid hydrazide in 90 parts of benzene there is added 6 parts of acetic anhydride and the mixture is allowed to stand for 15 days. The resulting solution is extracted with dilute hydrochloric acid and the acid extract is made strongly alkaline. A precipitate forms and redissolves. The pH is adjusted to about 9 and the mixture is extracted with ether. The ether extract is dried and the solvent is evaporated to leave a yellow glass which is boiled with hexane. The hexane solution is decanted from a small amount of oily solid, concentrated to three fourths of the original volume and cooled. It is again decanted from the solid and further concentrated before it is again cooled. The white powder which forms is separated by filtration and recrystallized from ether to give 1-acetyl-2-[9 - (2-diethylaminoethyl)fluorene-9-carboxylic]hydrazine melting at about 102–103° C.

EXAMPLE 8

A mixture of 41 parts of fluorene-9-carboxylic acid, 59 parts of thionyl chloride, and 165 parts of carbon tetrachloride is refluxed for 70 minutes. The mixture is cooled to room temperature and volatile material is removed under reduced pressure. The resulting residue is dissolved in 225 parts of dry benzene and cooled in an ice-water bath. Then, a solution of 14.8 parts of 1,1,2-trimethylhydrazine and 20.2 parts of triethylamine in 45 parts of dry benzene is added portionwise over a period of 30 minutes while the temperature is maintained at about 10–15° C. The mixture is then allowed to warm to room temperature before it is diluted with 450 parts of benzene. It is then shaken with dilute sodium hydroxide solution and the organic layer is separated. The organic solution is dried over sodium sulfate and the solvent is evaporated under reduced pressure. The residue is triturated with hexane and filtered before it is dissolved in 840 parts of boiling ether. It is then concentrated to about 1/10 of the initial volume and allowed to stand at room temperature. The precipitate which forms is separated by filtration and washed with ether and pentane before it is recrystallized from ether to give 1-(fluorene-9-carbonyl)-1,2,2-trimethylhydrazine melting at about 138–140.5° C.

To a solution of 0.1 part of ferric nitrate nonahydrate in 1500 parts by volume of liquid ammonia there is added 3.1 parts of potassium metal in several pieces with stirring. Stirring of the liquid ammonia solution is continued for 10 minutes after the blue color disappears. Then, 21.4 parts of 1 - (fluorene - 9-carbonyl)-1,2,2-trimethylhydrazine is added portionwise in 1–2 minutes. This mixture is stirred for 25 minutes before 10.9 parts of 2-diethylaminoethyl chloride is added over a period of 1–2 minutes. The resulting mixture is stirred for 6 hours before the ammonia is allowed to evaporate. Water and ether are added to the residue and stirred vigorously. The ether solution is then separated, washed with water and dried over sodium sulfate. It is then extracted with dilute hydrochloric acid. The acid extract is made alkaline with dilute sodium hydroxide and extracted with ether. The ether extract is dried and the solvent is evaporated to leave a light brown oil. The oil is dissolved in benzene and chromatographed on a silica column. The column is eluted with benzene containing increasing concentrations of ethanol. The middle fractions eluted with 10% ethanol in benzene are combined and the solvent is evaporated to leave a residue which is dissolved in methylene chloride. The methylene chloride solution is washed with dilute potassium carbonate and dried over sodium sulfate. The solvent is evaporated to leave a residual oil. The oil is dissolved in ether and the ether solution is concentrated and diluted with pentane. The precipitate which forms is separated by filtration and dried under a vacuum to give 1-[9-(2-diethylaminoethyl)fluorene-9-carbonyl]-1,2,2-trimethylhydrazine melting at about 60–62° C. This compound has the following formula

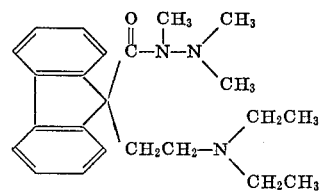

What is claimed is:

1. A compound of the formula

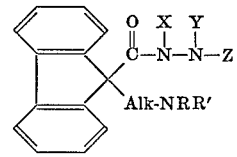

wherein Alk is lower alkylene; —NRR' is selected from the group consisting of di(lower alkyl)amino and piperidino; X and Y are each selected from the group consisting of hydrogen and methyl; and Z is selected from the group consisting of hydrogen, methyl, and acetyl.

2. A compound according to claim 1 which has the formula

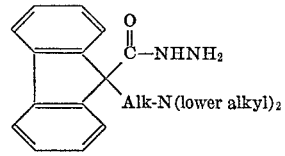

wherein Alk is lower alkylene.

3. A compound according to claim 1 which is 9-(2-diethylaminoethyl)fluorene-9-carboxylic acid hydrazide.

4. A compound according to claim 1 which is 9-(2-diisopropylaminoethyl)fluorene-9-carboxylic acid hydrazine.

References Cited

UNITED STATES PATENTS 3,304,307    2/1967   Mizzoni _____ 260—293.62
3,476,545   11/1969   Mohr et al. _____ 260—558 H HENRY R. JILES, Primary Examiner H. I. MOATZ, Assistant Examiner U.S. Cl. X.R.

260—293.62, 471 R; 424—324